(12) United States Patent  
Kwatra et al.

(10) Patent No.: US 10,937,127 B2
(45) Date of Patent: Mar. 2, 2021

(54) METHODS AND SYSTEMS FOR MANAGING TEXT IN RENDERED IMAGES

(71) Applicant: INTERNATIONAL BUSINESS MACHINES CORPORATION, Armonk, NY (US)

(72) Inventors: Shikhar Kwatra, Durham, NC (US); Peeyush Jaiswal, Boca Raton, FL (US); Priyansh Jaiswal, Boca Raton, FL (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 56 days.

(21) Appl. No.: 16/102,619

(22) Filed: Aug. 13, 2018

(65) Prior Publication Data  
US 2020/0051208 A1 Feb. 13, 2020

(51) Int. Cl.  
*G06T 3/40* (2006.01)

(52) U.S. Cl.  
CPC .................................. *G06T 3/403* (2013.01)

(58) Field of Classification Search  
CPC . G06T 11/60; G06T 3/403; G06T 3/40; G06F 3/04817; G06F 3/0484; G06F 21/36; G06K 9/00463; H04N 1/4446; H04N 21/4312  
See application file for complete search history.

(56) References Cited

U.S. PATENT DOCUMENTS

| | | | |
|---|---|---|---|
| 7,743,325 B2 | 6/2010 | Berker et al. | |
| 7,916,157 B1 | 3/2011 | Kelley et al. | |
| 8,423,900 B2 | 4/2013 | Fillion et al. | |
| 9,418,068 B2 | 8/2016 | Maloney et al. | |
| 9,489,121 B2 | 11/2016 | Davis et al. | |
| 9,824,137 B2 | 11/2017 | Fidler et al. | |
| 9,858,698 B2 | 1/2018 | Deluca et al. | |
| 2006/0020899 A1* | 1/2006 | Gusmorino | G06F 3/04817 715/765 |
| 2006/0198555 A1* | 9/2006 | Hosotsubo | G06T 11/60 382/162 |
| 2008/0144654 A1* | 6/2008 | Frishberg | H04L 43/045 370/466 |
| 2010/0115400 A1* | 5/2010 | Yamanakajima | G06F 40/186 715/243 |
| 2011/0131544 A1* | 6/2011 | Majumder | G06F 30/17 716/139 |

(Continued)

*Primary Examiner* — Chante E Harrison  
(74) *Attorney, Agent, or Firm* — Griffiths & Seaton PLLC

(57) ABSTRACT

Embodiments for managing text in rendered images by one or more processors are described. An image rendered by a display device is detected. The rendered image includes an object component and a text component at least partially overlapping the object component. A size of the object component of the image is caused to change. Based on a comparison of the changed size of the object component of the image to a size of the text component of the image, one or more text modification option is caused to be rendered by the display device. An indication of a selection of at least one of the one or more text modification option is received. The text component of the image is caused to change based on the selected one or more text modification option.

18 Claims, 8 Drawing Sheets

(56) References Cited

U.S. PATENT DOCUMENTS

| | | | |
|---|---|---|---|
| 2011/0252309 A1* | 10/2011 | Simmons | G06F 40/103 |
| | | | 715/243 |
| 2013/0063736 A1* | 3/2013 | Chiba | G06T 11/60 |
| | | | 358/1.6 |
| 2014/0267438 A1 | 9/2014 | Sosinski | |
| 2015/0055154 A1* | 2/2015 | Hasegawa | H04N 1/04 |
| | | | 358/1.9 |
| 2015/0082159 A1* | 3/2015 | DeLuca | G06K 9/00463 |
| | | | 715/271 |
| 2016/0093080 A1* | 3/2016 | Tumanov | G06T 11/60 |
| | | | 345/589 |
| 2017/0032554 A1* | 2/2017 | O'Donovan | G06N 7/005 |
| 2018/0052594 A1* | 2/2018 | Bemel-Benrud | G06F 16/2379 |
| 2018/0089902 A1* | 3/2018 | Zhu | G06T 7/73 |
| 2018/0174345 A1* | 6/2018 | Yamanaka | G06T 11/00 |
| 2018/0204361 A1* | 7/2018 | Tinsman | G06T 11/60 |
| 2019/0163330 A1* | 5/2019 | Lotinsky | G06F 3/0483 |
| 2019/0163726 A1* | 5/2019 | Cai | G06F 40/111 |

* cited by examiner

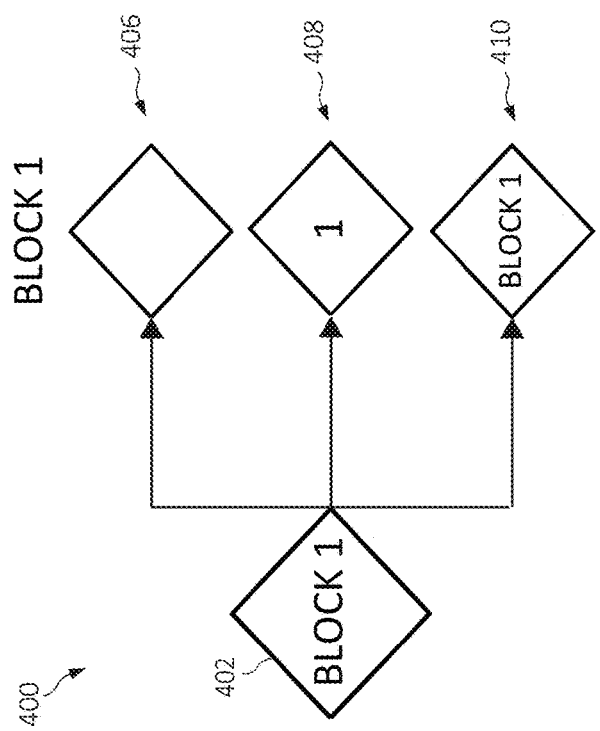
FIG. 7
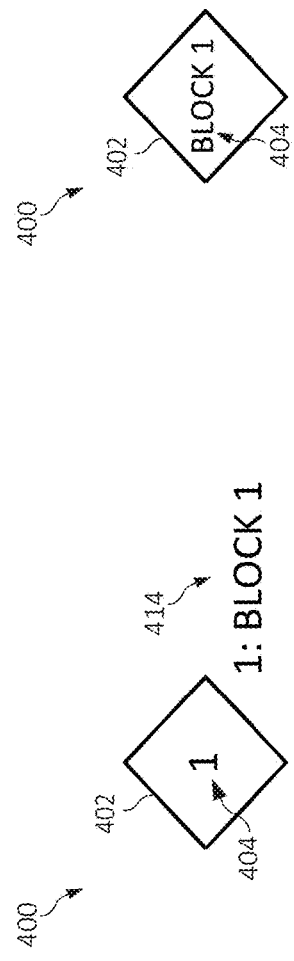
FIG. 10
FIG. 9
FIG. 8

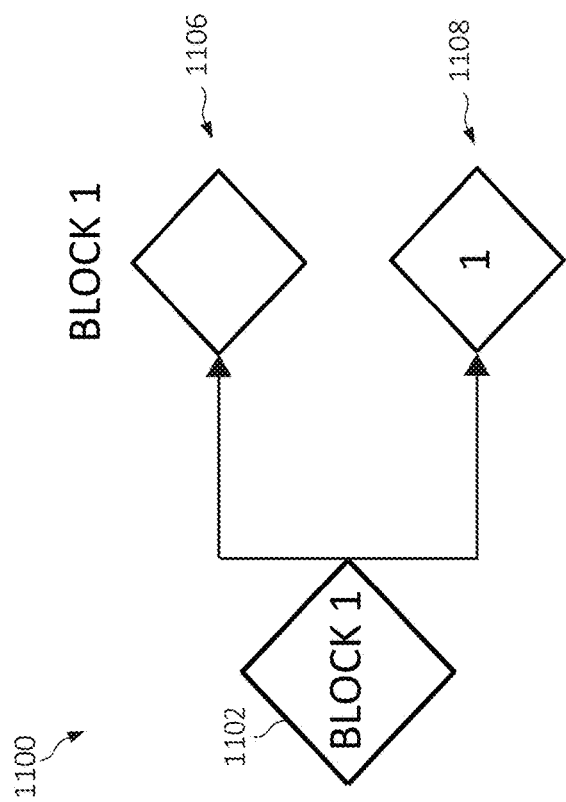
FIG. 15
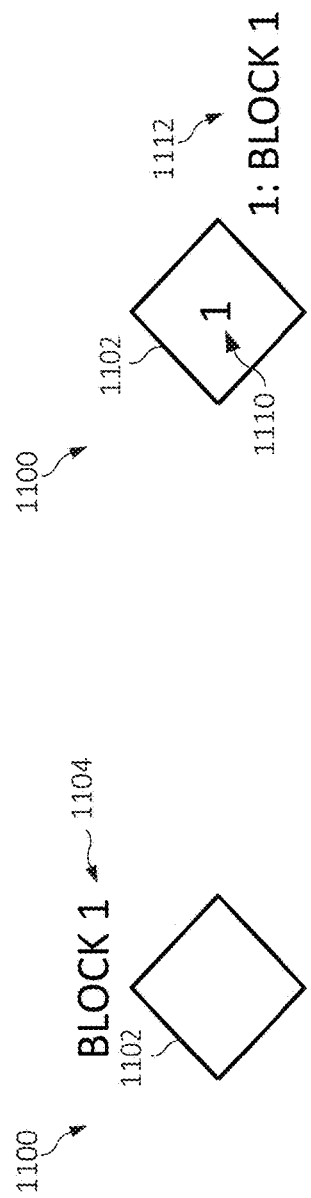
FIG. 16
FIG. 17

METHODS AND SYSTEMS FOR MANAGING TEXT IN RENDERED IMAGES

BACKGROUND OF THE INVENTION

Field of the Invention

The present invention relates in general to computing systems, and more particularly, to various embodiments for managing text in rendered images.

Description of the Related Art

Digital images, or components thereof, often include text (e.g., alphanumeric characters) that provide information to the viewer. For example, in a block diagram, at least some of the blocks may include text, such as labels, descriptions, etc., to indicate what the blocks represent. In most conventional computing systems, depending on the application used, when the size of such components is changed, the included text may also change in size, at least relative to the rest of the component, in an undesirable way.

For instance, if a block that includes text in a block diagram is reduced in size, the text may be reduced in size in a manner proportional to that of the block itself. In such instances, depending on the reduction in size of the block, the original size of the text, etc., the text may become unreadable (i.e., at least for some viewers). Similarly, if the size of the text is not reduced, after the block itself is made smaller, the text may no longer appropriately "fit" within the block (e.g., the text may extend beyond the periphery of the block).

SUMMARY OF THE INVENTION

Various embodiments for managing text in rendered images by one or more processors are described. In one embodiment, by way of example only, a method for managing text in rendered images, again by one or more processors, is provided. An image rendered by a display device is detected. The rendered image includes an object component and a text component at least partially overlapping the object component. A size of the object component of the image is caused to change. Based on a comparison of the changed size of the object component of the image to a size of the text component of the image, one or more text modification option is caused to be rendered by the display device. An indication of a selection of at least one of the one or more text modification option is received. The text component of the image is caused to change based on the selected one or more text modification option.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 7 is a plan view of the image of FIG. 6 and a plurality of text modification options;

FIGS. 8-10 are plans views of the image of FIG. 7 after respective text modification options have been selected;

FIG. 15 is a plan view of the image of FIG. 14 and a plurality of text modification options;

FIGS. 16 and 17 are plans views of the image of FIG. 15 after respective text modification options have been selected.

DETAILED DESCRIPTION OF THE DRAWINGS

Figure 1:
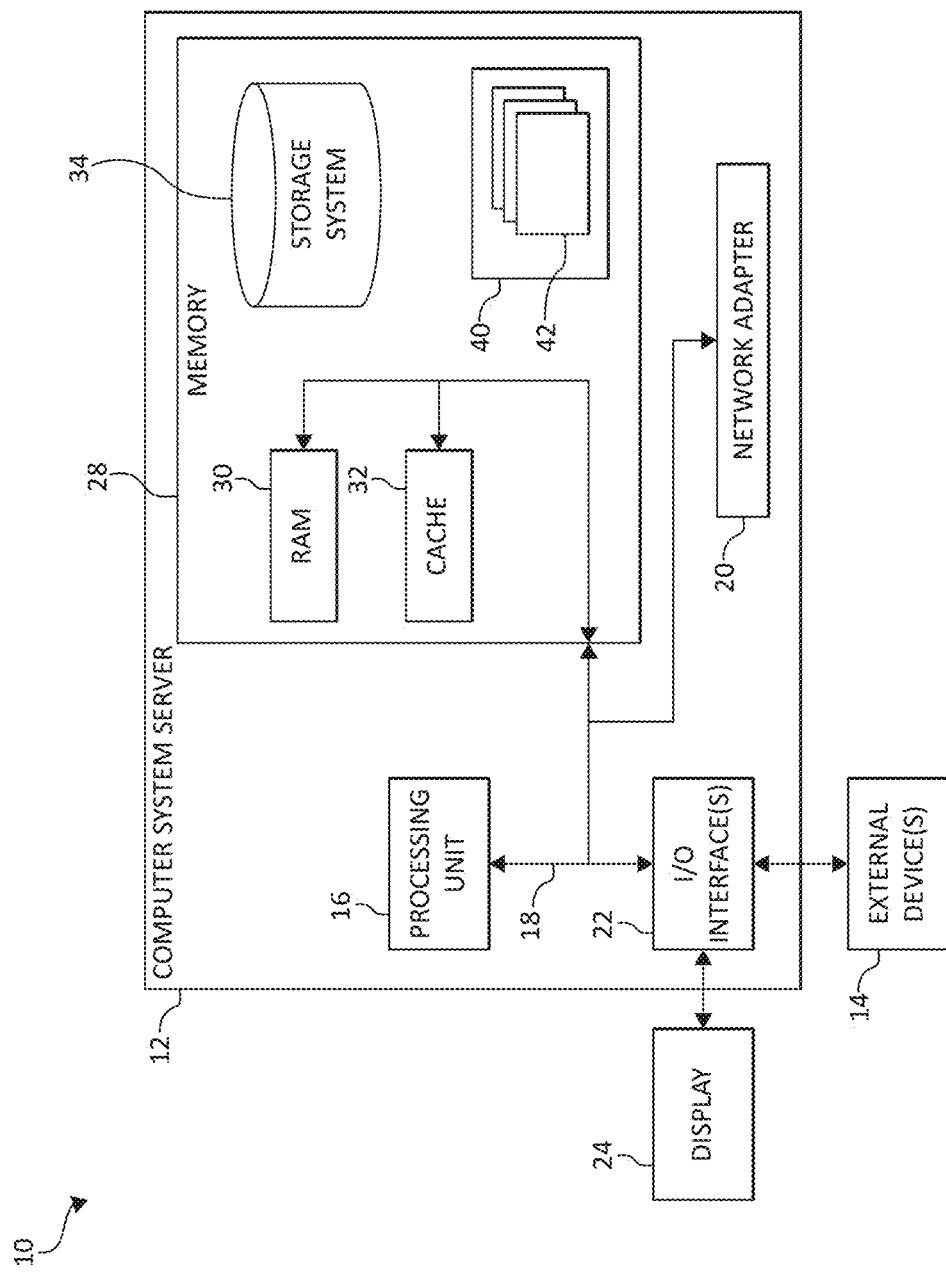
FIG. 1 is a block diagram depicting an exemplary computing node according to an embodiment of the present invention.

As discussed above, digital images, or components or portions thereof, often include text (e.g., alphanumeric characters) that provide information to the viewer. For example, in a block diagram, at least some of the blocks may include text, such as labels, descriptions, etc., to indicate what the blocks represent. In most conventional computing systems, depending on the application used, when the size of such components is changed, the included text may also change in size, at least relative to the component, in an undesirable way.

For instance, if a block that includes text in a block diagram is reduced in size, the text may be reduced in size in a manner proportional to that of the block itself. In such instances, depending on the reduction in size of the block, the original size of the text, etc., the text may become unreadable (e.g., too small) at least for some viewers. Similarly, if the size of the text is not reduced, after the block itself is made smaller, the text may no longer appropriately "fit" within the block. That is, the text may become larger than and/or extend beyond the periphery (or outer edge) of the block. Such a result may be considered to be not aesthetically pleasing.

To address these needs, some embodiments described herein provide methods and systems for managing text in rendered images which, for example, when the size of the image(s) and/or portions thereof is changed, the appearance (e.g., size) of any text associated with (e.g., embedded within) the images or portions thereof is controlled independently to ensure readability and/or aesthetic appeal.

In some embodiments, when an image, or a component or object thereof, that includes text (e.g., the text is at least partially overlapping the image/component/object) is detected as being resized (e.g., automatically and/or in response to user input), the size of the text is changed relative to that of the image. For example, a minimum text (or font) size may be set (e.g., by a user setting, system setting, etc.), and as the image is reduced in size, the text will only be reduced to that size to ensure readability, and/or if the distance between the text and the periphery of the image falls below predetermined distance or the text extends beyond the periphery of the image, the manner in which the text is displayed is changed (e.g., displayed completely outside the image, displayed using a legend, etc.).

In some embodiments, using image analysis, the availability of space around text embedded within an image is identified, and as the image is reduced in size, the system detects when the text may overlap the periphery of the image. Until such occurs, the size (and/or manner in which the text is displayed) may not be changed. If there is no available space around the text, an indication (or alert) may be generated (e.g., displayed) to the user, informing the user of the potential issue with the text. In some embodiments, the generating of the indication includes displaying several options for changing the text to the user. For example, the displayed options may include reducing the size of the text to a predetermined threshold (e.g., assuming that size is appropriate for the reduced size of the image), rearranging the text (e.g., using a "wraparound" text configuration), moving the text from the image and positioning it outside of the image, and displaying the text using a legend.

In some embodiments, the functionality associated with at least some of such options is automatically performed before any options are displayed to the user. For example, as the image is reduced in size, the text may be automatically reduced in size to the set threshold and/or the text may be rearranged. In such embodiments, if the size of the image is reduced to the point that automatically implemented changes to the text do not prevent, for example, the text from extending beyond the periphery of the image, only then are options displayed to the user.

In some embodiments, at least some of the functionality described herein may be set by user or system preferences. For example, a user may be able to set a minimum text size (e.g., based on his/her eyesight, the intended use/audience of the image, etc.) and/or which options are displayed. In some embodiments, over time, the system may be able to learn which options are preferred by the user (and/or multiple users) such that eventually the user's (or users') preferred options are automatically implemented when needed.

As such, in some embodiments, the methods and/or systems described herein may utilize "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, modifications made to text in images. Utilizing the models, the performance (or operation) of the system (e.g., utilizing/based on new inputs) may be predicted and/or the performance of the system may be optimized by investigating how changes in the input(s) effect the output(s).

In particular, in some embodiments, a method, by one or more processors, for managing text in rendered images is provided. An image rendered by a display device is detected. The rendered image includes an object component and a text component at least partially overlapping the object component. A size of the object component of the image is caused to change. Based on a comparison of the changed size of the object component of the image to a size of the text component of the image, one or more text modification option is caused to be rendered by the display device. An indication of a selection of at least one of the one or more text modification option is received. The text component of the image is caused to change based on the selected one or more text modification option.

The selected one or more modification option may include replacing the text component of the image with a symbol and causing a legend associated with the text component and the symbol to be rendered by the display device. The legend may be rendered beyond a periphery of the object component of the image.

The causing of the size of the object component of the image to change may include reducing the size of the object component of the image. The causing of the one or more text modification option to be rendered by the display device may occur if, with the changed size of the object component of the image, a distance between the text component of the image and a periphery of the object component of the image is less than a predetermined threshold or at least a portion of the text component of the image extends beyond a periphery of the object component of the image.

The one or more text modification option may include a plurality of text modification options. The plurality of text modification options may include at least one of rendering the text component of the image utilizing a legend or moving the text component of the image relative to the object component of the image. The plurality of text modification options may include at least one of reducing the size of the text component of the image or changing a shape of the text component of the image.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
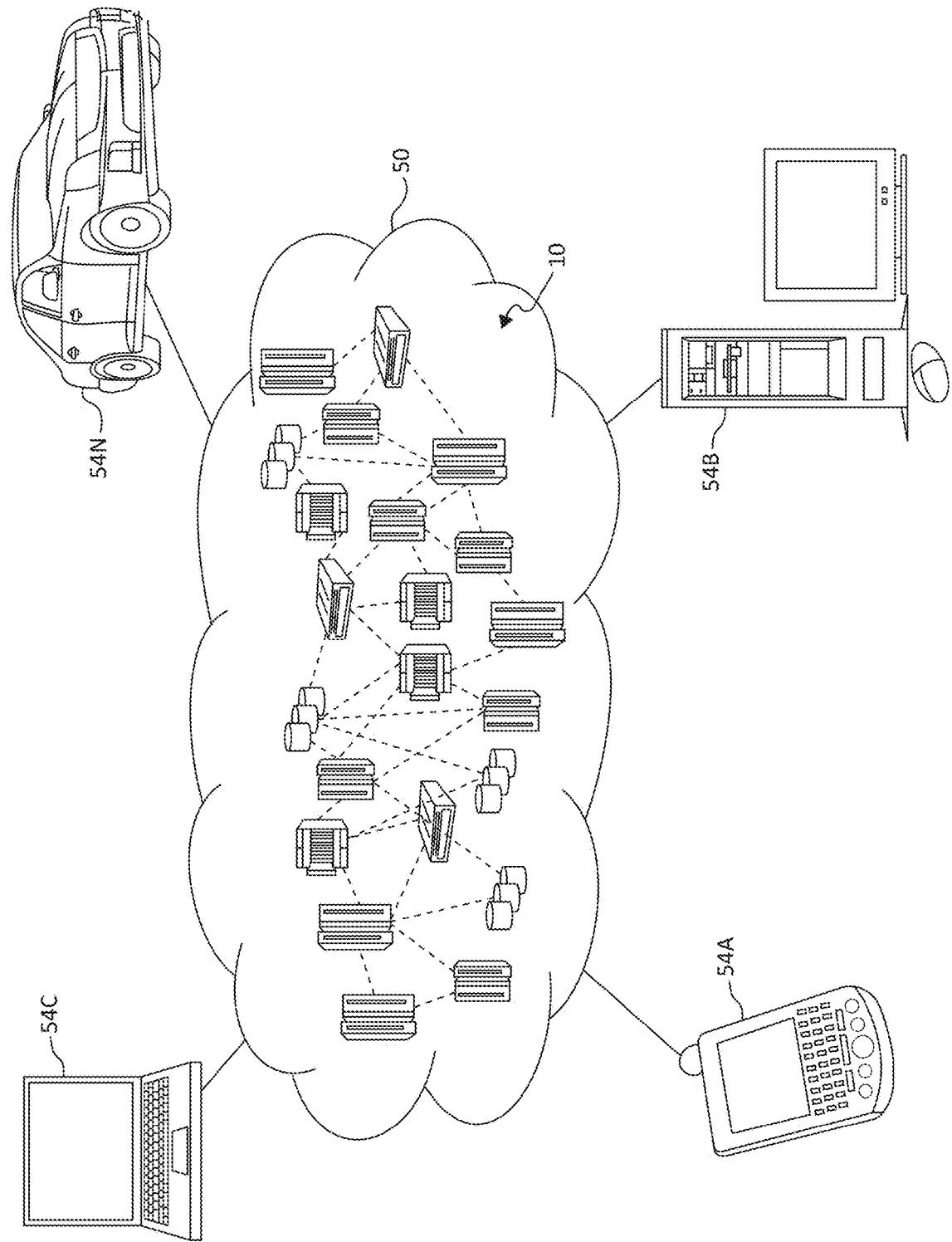
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular telephone or PDA 54A, desktop computer 54B, and/or laptop computer 54C, and vehicles (e.g., automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
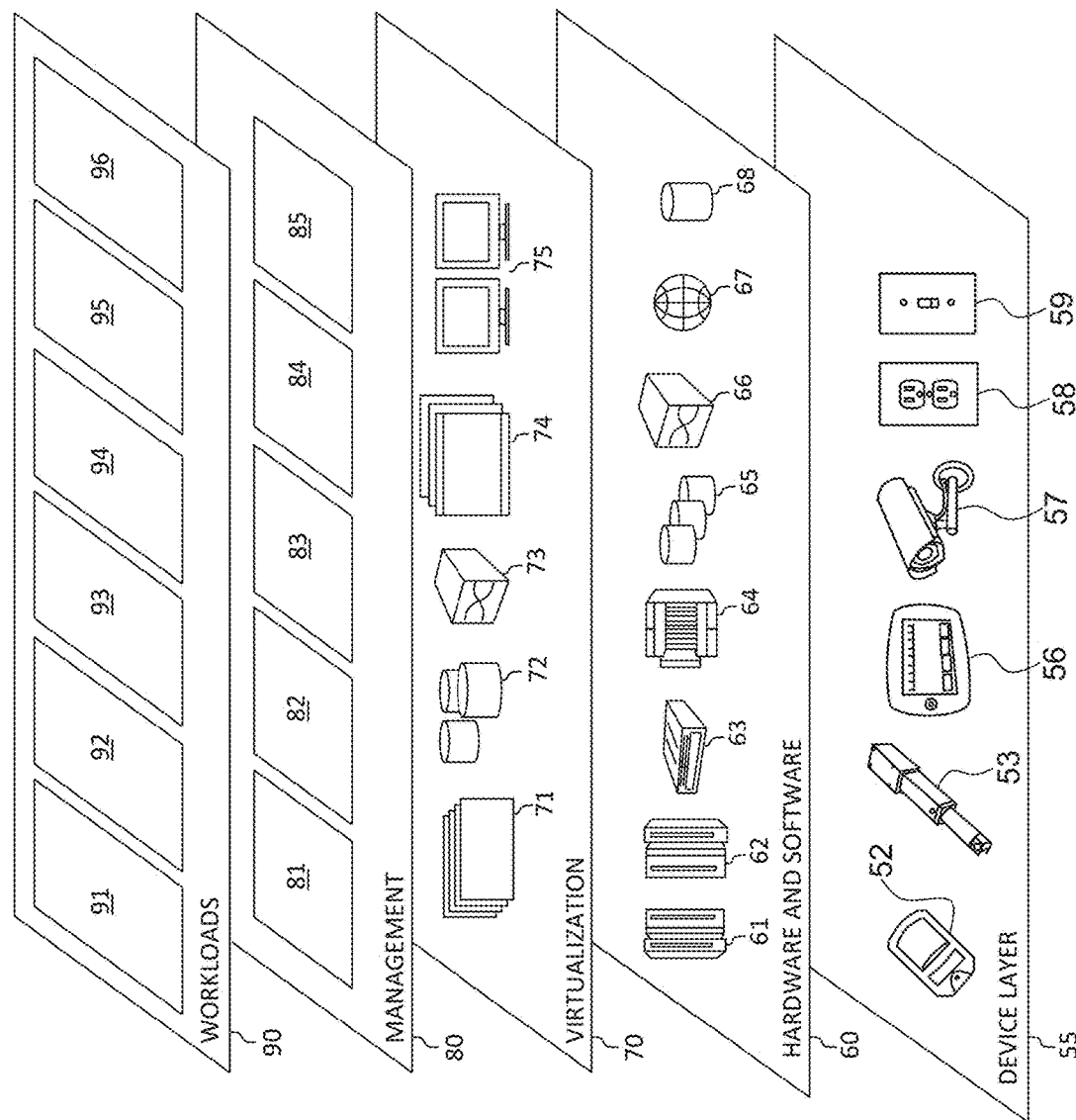
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing text in rendered images as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As mentioned above, in some embodiments, when an image (or portion/object/component thereof) having text associated therewith (e.g., at least partially overlapping, embedded within, etc.) is detected as changing in size or being changed in size, the text is managed in a way separately from the image. In some embodiments, OCR is used to detect or identify text within the image(s) (or objects thereof). Using a contextual analysis of the drawing, the system may uniquely identify each object component and correlate the embedded text with the objects. Using image analysis, the system may identify the available space around the embedded text, which may be used to identify how much an object can be reduced in size (e.g., before the text is changed). When the size of the object(s) is reduced (or about to be reduced), the system may consider the object(s) and text separately, and the managing of the sizes thereof is also handled separately.

In some embodiments, if the text would extend beyond a periphery of the respective object with the reduced size, one or more options for modifying the text may be generated and displayed (e.g., next to the object). The options may include, for example, rearranging the text (e.g., using a "wrap-around" text configuration), moving the text from the image and positioning it outside of the image, and displaying the text using a legend. If user selects using a legend, the block(s) may be assigned a unique number (or other symbol) and a legend may be created and rendered to show the mapped embedded text.

FIGS. 4-17 illustrate images 400 and 1100 in various sizes and with various configurations of text associated therewith. It should be understood that in some embodiments the images shown in FIGS. 4-17 may be displayed by (or on), for example, a display device (e.g., active-matrix liquid-crystal display (AMLCD), light-emitting diode (LED) display, etc.) of a computing system as the images are being resized as described below. The images may be rendered using (and/or by) any appropriate application, such as drawing/imaging applications, word processing application, presentation/slide applications, etc. As such, it should be understood that the methods and systems described herein may be implemented using any suitable computing node. As described herein, a computing node may refer to any computing device, such as those described above (e.g., desktop PC, mobile electronic device, etc.), and/or a software application installed on a computing device (e.g., a drawing, imaging application, a web browser, etc). However, it should be understood that at least some of the images shown in FIGS. 4-17 may be intended simply to provide representations of the image resizing to facilitate understanding of the embodiments described herein (e.g., only some of the images may be displayed to a user).

Figure 4:
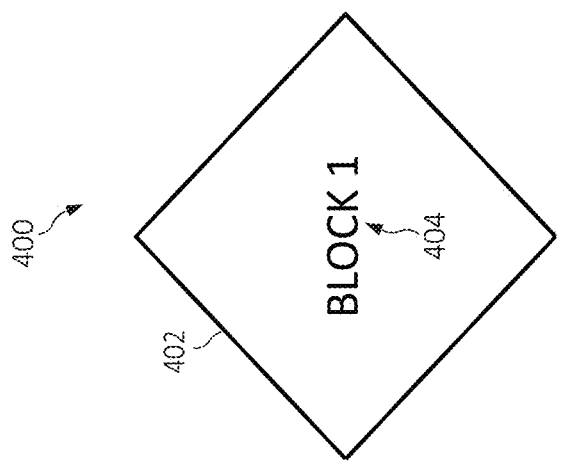
FIG. 4 is a plan view of an image having an object component and a text component according to an embodiment of the present invention.

FIG. 4 illustrates an exemplary image 400. In the embodiment shown, the image 400 includes an object (or object component) 402 and text (or a text component) 404. Although the object 402 shown has a relatively simple shape (e.g., a "diamond" block), it should be understood that in some embodiments the object may have more complicated shapes and include multiple colors, shades, textures, etc. (e.g., an image of a physical object, such as an automobile, person, etc.). In some embodiments, the text 404 is detected using, for example, optical character recognition (OCR), as is commonly understood.

In the depicted embodiment, the text 404 is positioned at the center of the object 402, and as shown in FIG. 4, the text 404 (and/or the object 402) is sized such that a (relatively) significant distance lies between the text 404 and the periphery (or outer edge) of the object 402. In some embodiments, the text 404 is integral part of the same image as that of the object 402 (i.e., the text 404 is not a separate component from the object 402). However, in some embodiments, the text 404 may be formed by a component that is distinct from that of the object 402 (e.g., the text 404 is formed via a "text box" positioned within the object). In the examples shown, the text 404 includes alphanumeric characters (i.e., "BLOCK 1"). However, it should be understood that in some embodiments, other symbols may be used, such as hieroglyphics, "emojis," etc.

Figure 5:
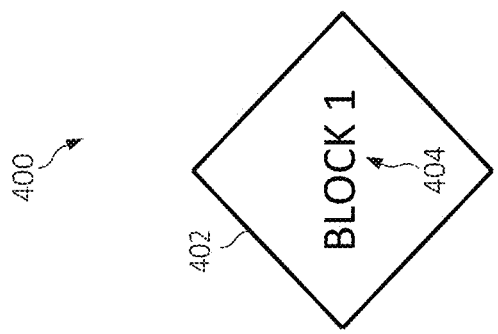
FIG. 5 is a plan view of the image of FIG. 4 after the size of the object component has been reduced.

Referring now to FIG. 5, the size of the object 402 has been reduced (i.e., compared to its size in FIG. 4). In some embodiments, the size of the object 402 is changed automatically (e.g., in response to a system setting). However, in some embodiments, the changing of the size of the object 402 may be performed in response to received user input. For example, a user may indicate that he/she wishes to change the size of the object 402 by, for example, clicking/dragging a portion of the object (e.g., with a cursor, mouse, etc.) or selecting the object and entering a new size (e.g., height, width, etc.) using keys/a keyboard.

It should be noted that in FIG. 5 although the size of the object has been reduced, the text 404 is the same size as it is in FIG. 4. As such, the distance between the text 404 and the periphery of the object 402 has been reduced. In some embodiments, as the size of the object 402 is reduced, no changes are made to the text 404 and/or no options for making changes to the text 404 are provided so long as the distance (e.g., as measured in pixels, font size units, a percentage of the size/height of the text, etc.) between the text 404 and the periphery of the object 402 remains above a predetermined threshold (e.g., which may be set/changed by a system setting, user preference, etc.).

Figure 6:
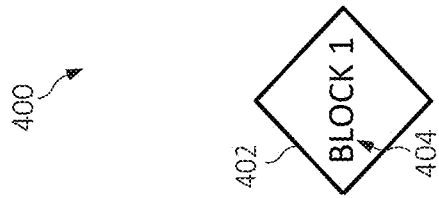
FIG. 6 is a plan view of the image of FIG. 4 after the size of the object component has been further reduced.

As shown in FIG. 6, the size of the object 402 has been further reduced while the text 404 has still not been changed. As such, the text 404 now overlaps and/or extends beyond the periphery of the object 402, which may be considered to affect the readability of the text 404 and/or the aesthetic appeal of the image 400 as a whole.

In response to such a situation, in some embodiments, one or more options for changing (or modifying) the text 404 are displayed. In particular, referring now to FIG. 7, the object 402 and text 404 are shown in the same relative sizes as that of FIG. 6 along with three options 406, 408, and 410 for changing the manner in which the text 404 is displayed. In the depicted embodiment, option 406 is associated with changing the text 404 by moving the text 404 so that all of the text lies beyond the periphery of the object 402 (while keeping the size of the text the same), option 408 is associated with displaying the text 404 using a legend (described in greater detail below), and option 410 is associated with reducing the size of the text (e.g., to a minimum threshold). Although not shown, in some embodiments, the options 406-410 may be displayed in a color (e.g., "greyed out") and/or line type (e.g., dashed) that is different than that of the object 402 and the text 404. In some embodiments, the user may select one of the options 406-410 in any suitable manner (e.g., via a cursor/mouse, keyboard, etc.). However, in some embodiments, the user may not select any of the options and leave the image 400 as shown in FIG. 6.

FIG. 8 illustrates the image 400 if the user selects option 406. As such, the text 404 has been moved outside (e.g., above) the object 402 such that all of the text 404 lies beyond the periphery of the object 402 (i.e., no portion of the text 404 overlaps/intersects/lies within the object 402). FIG. 9 illustrates the image 400 if the user selects option 408. As such, the text 404 has been deleted (or at least moved from the object 402) and replaced with a symbol 412 and a legend 414 is displayed. In the depicted embodiment, the symbol 412 is (also) an alphanumeric character (e.g., "1"). However, in other embodiments, other types of symbols maybe used, such as basic shapes, etc. The legend 414 is associated with (or includes) the symbol 412 and the text 404 (e.g., "1: BLOCK 1") and may be rendered in any appropriate position (e.g., at the bottom of the "page" or "sheet"). FIG. 10 illustrates the image 400 if the user selects option 410. As such, the size of the text 404 has been reduced to, for example, the minimum threshold (as described above) and fits within the periphery of the object 402 (with the reduced size).

It should be understood that in some embodiments option 410 is not provided to the user if the text 404, at the minimum threshold size, would not appropriately fit in the object 402 at the reduced size. It should also be noted that options 406-410 are merely intended as examples of possible text modification options, as in other embodiments, other options may be provided, such as rearranging the text (e.g., using a "wraparound" text configuration such that the "1" of "BLOCK 1" is positioned below "BLOCK"). Additionally, the options may be presented or provided to the user in different forms. For example, rather than displaying the options 406-410 as drawings/figures that represent the associated modification(s) to the image 400, the options may be provided in a text-based form (e.g., in a list where each option is referred to by a label, name, description, etc.).

Further, in some embodiments, the user may select more than one option (e.g., moving the text outside of the object and changing the size of the text).

Figure 11:
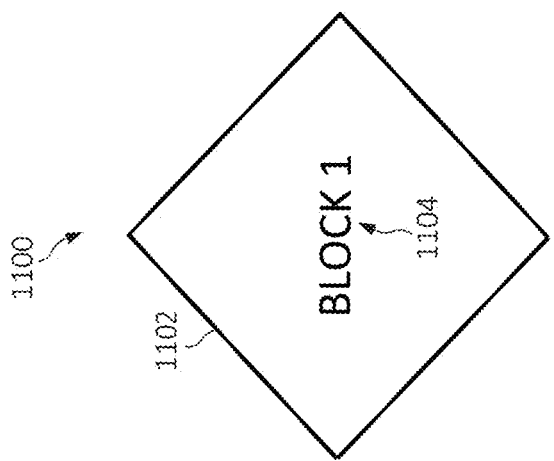
FIG. 11 is a plan view of an image having an object component and a text component according to an embodiment of the present invention.

FIG. 11 illustrates an exemplary image 1100, similar to that shown in FIGS. 4-10, that includes an object (or object component) 1102 and text (or a text component) 1104. In the depicted embodiment, the text 1104 is positioned at the center of the object 1102, and as shown in FIG. 11, the text 1104 (and/or the object 1102) is sized such that a (relatively) significant distance lies between the text 1104 and the periphery (or outer edge) of the object 1102. In some embodiments, the text 1104 is integral part of the same image as that of the object 1102 (i.e., the text 1104 is not a separate component from the object 1102). However, in some embodiments, the text 1104 may be formed by a component that is distinct from that of the object 1102 (e.g., the text 1104 is formed via a "text box" positioned within the object 1102). In the examples shown, the text 1104 includes alphanumeric characters (i.e., "BLOCK 1"). However, it should be understood that in some embodiments, other symbols may be used, such as hieroglyphics, "emojis," etc.

Figure 12:
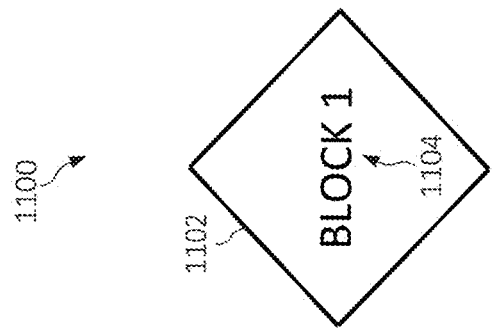
FIG. 12 is a plan view of the image of FIG. 11 after the size of the object component has been reduced.

Referring now to FIG. 12, the size of the object 1102 has been reduced (i.e., compared to its size in FIG. 11). The size of the object 1102 may be changed automatically or in response to received user input, as described above. It should be noted that in FIG. 12 although the size of the object 1102 has been reduced, the text 1104 is the same size as it is in FIG. 11. As such, the distance between the text 1104 and the periphery of the object 1102 has been reduced. As described above, in some embodiments, as the size of the object 1102 is reduced, no changes are made to the text 1104 and/or no options for making changes to the text 1104 are provided so long as the distance between the text 1104 and the periphery of the object 1102 remains above a predetermined threshold (e.g., which may be set/changed by a system setting, user preference, etc.).

Figure 13:
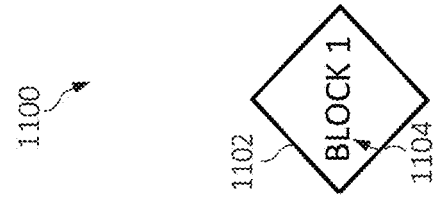
FIG. 13 is a plan view of the image of FIG. 12 after the size of the object component has been further reduced and the size of the text component has been reduced.

As shown in FIG. 13, the size of the object 402 has been further reduced. As may be apparent from comparing the size of the text 1104 in FIG. 12 with the size of the object 1102 in FIG. 13, if size of the text 1104 was not changed in FIG. 13, the text 1104 would overlap and/or extend beyond a periphery of the object 1102. As such, in FIG. 13, the size of the text 1104 has been reduced such that the text 1104 does not overlap and/or extend beyond the periphery of the object 1102. In some embodiments, such a change to the text 1104 is performed automatically in response to the size of the image 1102 being reduced. More particularly, in some embodiments, if needed to prevent the text 1104 from overlapping and/or extending beyond the periphery of the object 1102, the size of the text 1104 may be automatically reduced down to the minimum threshold (e.g., set by the user), as required by the reducing size of the object 1102.

Figure 14:
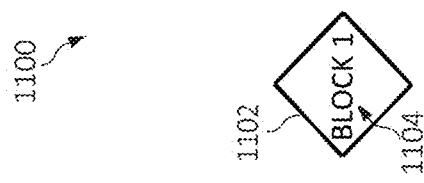
FIG. 14 is a plan view of the image of FIG. 13 after the size of the object component has been further reduced.

Referring now to FIG. 14, the object 1102 is further reduced in size while the text 1104 has still not been changed from FIG. 13. That is, the text 1104 has not been further reduced in size because of the minimum threshold. As such, the text 1104 now overlaps and/or extends beyond the periphery of the object 1102, which may be considered to affect the readability of the text 1104 and/or the aesthetic appeal of the image 1100 as a whole.

As described above, in response to such a situation, one or more options for changing the text 1104 may be displayed. In particular, referring now to FIG. 15, the object 1102 and text 1104 are shown in the same relative sizes as that of FIG. 14 along with two options 1106 and 1108 for changing the manner in which the text 1104 is displayed. In the depicted embodiment, option 1106 is associated with moving the text 1104 to that all of the text 1104 lies beyond the periphery of the object 1102 (while keeping the size of the text the same), and option 1108 is associated with displaying the text 1104 using a legend. It should be noted that in FIG. 15 no option associated with further reducing the size of the text 1104 is provided (e.g., because the size of the text 1104 is already at the minimum threshold).

As described above, in some embodiments, the user may select one of the options 1106 and 1108 in any suitable manner (e.g., via a cursor/mouse, keyboard, etc.). However, in some embodiments, the user may not select any of the options and leave the image 1100 as shown in FIG. 14.

FIG. 16 illustrates the image 1100 if the user selects option 1106. As such, the text 1104 has been moved outside (e.g., above) the object 1102 such that all of the text 1104 lies beyond the periphery of the object 1102 (i.e., no portion of the text 404 overlaps/intersects/lies within the object 401). FIG. 17 illustrates the image 1100 if the user selects option 1108. As such, the text 1104 has been deleted (or at least moved from the object 1102) and replaced with a symbol 1110 and a legend 1112 is displayed, as described above (e.g., with respect to FIG. 9).

Figure 18:
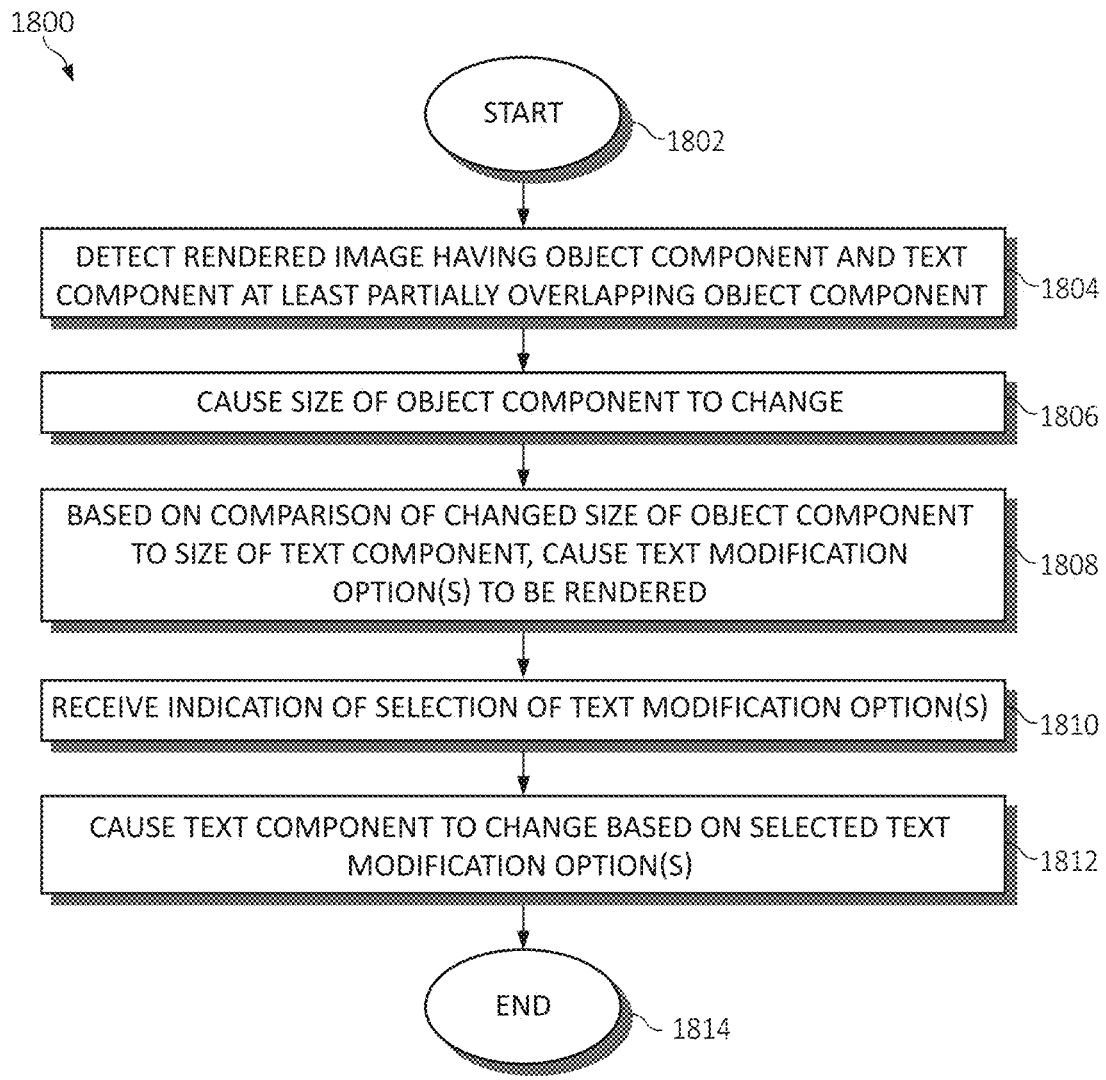
FIG. 18 is a flowchart diagram of an exemplary method for managing text in rendered images according to an embodiment of the present invention.

Turning to FIG. 18, a flowchart diagram of an exemplary method 1800 for managing text in rendered images is illustrated. Method 1800 begins (step 1802) with, for example, an image being rendered by, for example, a display device of a computing system or node. In some embodiments, the image include an object component and a text component that at least partially overlaps (e.g., is embedded within) the object component, as described above.

The image rendered by the display device is detected (step 1804). The detecting of the image (or at least the text) may be performed using OCR. In some embodiments, the text component is (at least initially) completely embedded within the object component (e.g., there is a gap between the text component and the periphery or outer edge of the object component).

A size of the object component of the image is caused to change (step 1806). That is, the size of the object component may be changed from a first size to a second size. The causing of the size of the object component of the image to change may include reducing the size of the object component of the image (i.e., to the second size).

Based on a comparison of the changed (or second) size of the object component of the image to a size of the text component of the image, one or more text modification option (e.g., a plurality of text modification options) is caused to be rendered by the display device (step 1808). The causing of the modification option(s) to be rendered by the display device may occur if, with the changed (or second) size of the object component of the image, a distance between the text component of the image and a periphery of the object component of the image is less than a predetermined threshold or at least a portion of the text component of the image extends (or would extend) beyond a periphery of the object component of the image. The text modification option(s) may include at least one of rendering the text component of the image utilizing a legend or moving the text component of the image relative to the object component of the image, reducing the size of the text component of the image, and/or changing a shape of the text component of the image.

An indication of a selection of at least one of the one or more text modification option is received (step 1810). For example, a user may select one of the options in any suitable manner, such as via a cursor/mouse, keyboard, etc.

The text component of the image is caused to change based on the selected one or more text modification option (step 1812). The selected one or more modification option may include replacing the text component of the image with a symbol and causing a legend associated with the text component and the symbol to be rendered by the display device. The legend may be rendered beyond a periphery of the object component of the image.

Method 1800 ends (step 1814) with, for example, the text component having been changed based on the selected text modification option(s). Method 1800 may be reinitiated with the resizing of another image having an object component and a text component, as described above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing text in rendered images:
    detecting an image rendered within a window of an application by a display device, wherein the rendered image includes an object component and a text component at least partially overlapping the object component;
    causing a size of the object component of the image to change; wherein the size of the object component is changed by resizing the object component within the window of the application according to user input received from a mouse or keyboard;
    based on a comparison of said changed size of the object component of the image to a size of the text component of the image, automatically causing one or more text modification option to be rendered by the display device;
    receiving an indication of a selection of at least one of the one or more text modification option; and
    causing the text component of the image to change based on said selected one or more text modification option, wherein causing the text component of the image to change based on the selected one or more modification option includes replacing the text component of the image with a symbol and causing a legend associated with the text component and the symbol to be rendered by the display device, wherein the legend is rendered beyond a periphery of the object component of the image.

2. The method of claim 1, wherein the causing of the size of the object component of the image to change includes reducing the size of the object component of the image.

3. The method of claim 1, wherein the causing of the one or more text modification option to be rendered by the display device occurs if, with said changed size of the object component of the image, a distance between the text component of the image and the periphery of the object component of the image is less than a predetermined threshold or at least a portion of the text component of the image extends beyond the periphery of the object component of the image.

4. The method of claim 1, wherein the one or more text modification option includes a plurality of text modification options.

5. The method of claim 4, wherein the plurality of text modification options includes at least one of rendering the text component of the image utilizing the legend or moving the text component of the image relative to the object component of the image.

6. The method of claim 4, wherein the plurality of text modification options includes at least one of reducing the size of the text component of the image or changing a shape of the text component of the image.

7. A system for managing text in rendered images comprising:
    at least one processor that
        detects an image rendered within a window of an application by a display device, wherein the rendered image includes an object component and a text component at least partially overlapping the object component;

causes a size of the object component of the image to change; wherein the size of the object component is changed by resizing the object component within the window of the application according to user input received from a mouse or keyboard;

based on a comparison of said changed size of the object component of the image to a size of the text component of the image, automatically causes one or more text modification option to be rendered by the display device;

receives an indication of a selection of at least one of the one or more text modification option; and causes the text component of the image to change based on said selected one or more text modification option, wherein causing the text component of the image to change based on the selected one or more modification option includes replacing the text component of the image with a symbol and causing a legend associated with the text component and the symbol to be rendered by the display device, wherein the legend is rendered beyond a periphery of the object component of the image.

8. The system of claim 7, wherein the causing of the size of the object component of the image to change includes reducing the size of the object component of the image.

9. The system of claim 7, wherein the causing of the one or more text modification option to be rendered by the display device occurs if, with said changed size of the object component of the image, a distance between the text component of the image and the periphery of the object component of the image is less than a predetermined threshold or at least a portion of the text component of the image extends beyond the periphery of the object component of the image.

10. The system of claim 7, wherein the one or more text modification option includes a plurality of text modification options.

11. The system of claim 10, wherein the plurality of text modification options includes at least one of rendering the text component of the image utilizing the legend or moving the text component of the image relative to the object component of the image.

12. The method of claim 10, wherein the plurality of text modification options includes at least one of reducing the size of the text component of the image or changing a shape of the text component of the image.

13. A computer program product for managing text in rendered images by one or more processors, the computer program product comprising a non-transitory computer-readable storage medium having computer-readable program code portions stored therein, the computer-readable program code portions comprising:

an executable portion that detects an image rendered within a window of an application by a display device, wherein the rendered image includes an object component and a text component at least partially overlapping the object component;

an executable portion that causes a size of the object component of the image to change;

wherein the size of the object component is changed by resizing the object component within the window of the application according to user input received from a mouse or keyboard;

an executable portion that, based on a comparison of said changed size of the object component of the image to a size of the text component of the image, automatically causes one or more text modification option to be rendered by the display device;

an executable portion that receives an indication of a selection of at least one of the one or more text modification option; and an executable portion that causes the text component of the image to change based on said selected one or more text modification option, wherein causing the text component of the image to change based on the selected one or more modification option includes replacing the text component of the image with a symbol and causing a legend associated with the text component and the symbol to be rendered by the display device, wherein the legend is rendered beyond a periphery of the object component of the image.

14. The computer program product of claim 13, wherein the causing of the size of the object component of the image to change includes reducing the size of the object component of the image.

15. The computer program product of claim 13, wherein the causing of the one or more text modification option to be rendered by the display device occurs if, with said changed size of the object component of the image, a distance between the text component of the image and the periphery of the object component of the image is less than a predetermined threshold or at least a portion of the text component of the image extends beyond the periphery of the object component of the image.

16. The computer program product of claim 13, wherein the one or more text modification option includes a plurality of text modification options.

17. The computer program product of claim 16, wherein the plurality of text modification options includes at least one of rendering the text component of the image utilizing the legend or moving the text component of the image relative to the object component of the image.

18. The computer program product of claim 16, wherein the plurality of text modification options includes at least one of reducing the size of the text component of the image or changing a shape of the text component of the image.

* * * * *